United States Patent
Matsuda et al.

(10) Patent No.: US 8,808,813 B2
(45) Date of Patent: Aug. 19, 2014

(54) METHOD OF PRODUCING LIQUID CRYSTALLINE COATING LIQUID, AND OPTICALLY ANISOTROPIC FILM

(75) Inventors: Shoichi Matsuda, Ibaraki (JP); Toru Umemoto, Ibaraki (JP); Tadayuki Kameyama, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/579,408

(22) PCT Filed: May 19, 2011

(86) PCT No.: PCT/JP2011/061506
§ 371 (c)(1),
(2), (4) Date: Aug. 16, 2012

(87) PCT Pub. No.: WO2012/029362
PCT Pub. Date: Mar. 8, 2012

(65) Prior Publication Data
US 2012/0314179 A1    Dec. 13, 2012

(30) Foreign Application Priority Data
Sep. 3, 2010    (JP) ................................. 2010-197646

(51) Int. Cl.
*C09K 19/60*    (2006.01)
*C09K 19/54*    (2006.01)
*C09K 19/52*    (2006.01)
*C09K 19/22*    (2006.01)

(52) U.S. Cl.
USPC .................... 428/1.1; 252/299.01; 252/299.1; 252/299.5; 252/299.68

(58) Field of Classification Search
USPC ................. 428/1.31, 1.1; 252/299.01, 299.1, 252/299.5, 299.68, 299.62
See application file for complete search history.

(56) References Cited

U.S. PATENT DOCUMENTS

| 2007/0287830 A1 | 12/2007 | Sano et al. |
| 2010/0039608 A1 | 2/2010 | Matsuda et al. |

FOREIGN PATENT DOCUMENTS

| CN | 101583692 A | 11/2009 |
| JP | 2-309302 A | 12/1990 |
| JP | 2657416 B2 | 9/1997 |
| JP | 2006-206878 A | 8/2006 |
| JP | 2008150517 A | * 7/2008 |
| JP | 2009-139806 A | 6/2009 |
| JP | 2010-089075 A | 4/2010 |

OTHER PUBLICATIONS

English translation by computer for JP 2008-150517, http://www4.ipdl.inpit.go.jp/Tokujitu/PAJdetail.ipdl?N0000=60&N0120=01&N2001=2&N3001=2008-150517.*
English translation by computer for JP 2010-089075, http://www4.ipdl.inpit.go.jp/Tokujitu/PAJdetail.ipdl?N0000=60&NO120=01&N2001=2&N3001=2010-089075.*
International Search Report for PCT/JP2011/061506, mailing date of Jun. 14, 2011.
Taiwanese Office Action dated Sep. 5, 2013, issued in corresponding Taiwanese Patent Application No. 100118316, w/ partial English translation.
Korean Office Action dated Oct. 23, 2013, issued in corresponding Korean Patent Application No. 10-2012-7006259, w/ partial English translation.
Japanese Office Action dated Jan. 10, 2014, issued in Japanese Patent Application No. 2010-197646 with Partial English Translation. (4 pages).
Chinese Office Action dated Jul. 29, 2013, issued in corresponding Chinese Patent Application No. 201180003771.0 with partial English translation (9 pages).

* cited by examiner

*Primary Examiner* — Shean C Wu
(74) *Attorney, Agent, or Firm* — Westerman, Hattori, Daniels & Adrian, LLP

(57) ABSTRACT

The present invention provides a method of producing a liquid crystalline coating liquid that substantially does not contain a fine crystal. The method of producing a liquid crystalline coating liquid of the present invention contains a heating step of heating a treatment liquid containing a lyotropic liquid crystalline compound containing an impurity, and a solvent, a depositing step of depositing a deposit by cooling the treatment liquid after the heating step to a temperature lower than 40° C., and a removing step of removing the deposit from the treatment liquid.

8 Claims, 1 Drawing Sheet

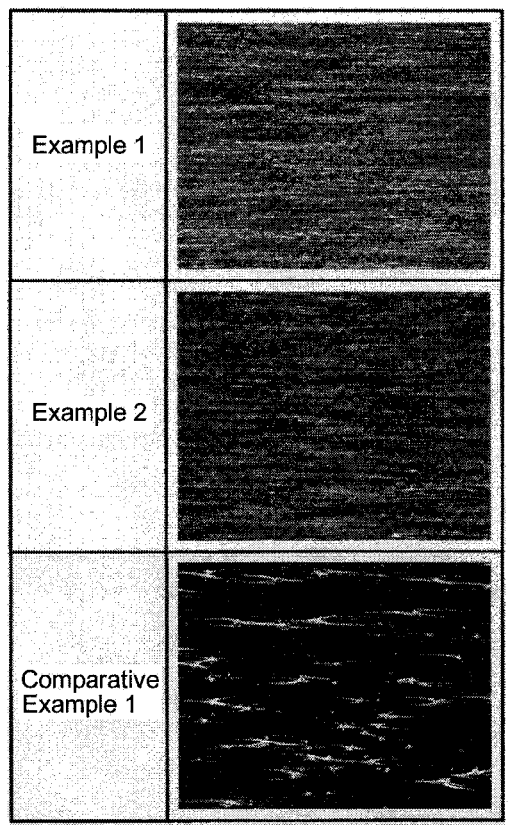

METHOD OF PRODUCING LIQUID CRYSTALLINE COATING LIQUID, AND OPTICALLY ANISOTROPIC FILM

TECHNICAL FIELD

The present invention relates to a method of producing a liquid crystalline coating liquid that serves as a material for forming an optically anisotropic film.

BACKGROUND ART

A liquid crystalline coating liquid containing a lyotropic liquid crystalline compound is used, for example, in producing an optically anisotropic film. Hereafter, the "liquid crystalline coating liquid" may be simply referred to as a "coating liquid".

Specifically, a lyotropic liquid crystalline compound forms a supramolecular associated body in the coating liquid, and the coating liquid exhibits a liquid crystal phase by this associated body. When a coating film is formed by casting this coating liquid on a base material while applying a shearing force to the coating liquid, the longer axis of the supramolecular associated body is oriented in the casting direction in this coating film. Such a method of forming a coating film by casting a coating liquid is generally referred to as the "solution casting method". Thereafter, by drying the coating film, a film constituted of the oriented lyotropic liquid crystalline compound is obtained. This film can be used as an optically anisotropic film.

In the meantime, in producing the optically anisotropic film, it is preferable to use a coating liquid that exhibits a stable liquid crystal phase.

Patent Document 1 discloses that a lyotropic liquid crystalline compound may become insoluble in a liquid, and this may become a crystal body to inhibit the exhibition of the liquid crystal phase. In order to prevent this lyotropic liquid crystalline compound from forming a crystal body, Patent Document 1 discloses a method of producing a coating liquid having a step of preparing a pre-treatment liquid containing a solvent and a crystal body of a lyotropic liquid crystalline compound, a step of obtaining an isotropic solution by heat-treating the pre-treatment liquid at a temperature above or equal to the melting point of the crystal body, and a step of cooling the isotropic solution to a temperature below or equal to the temperature at which the liquid crystal phase is exhibited.

According to the aforementioned method disclosed in Patent Document 1, a coating liquid exhibiting a stable liquid crystal phase can be obtained, so that an optically anisotropic film can be produced by forming this into a film by the solution casting method.

However, even in a case in which the lyotropic liquid crystalline compound does not become a crystal body, a fine crystal may be contained in the coating liquid. An optically anisotropic film formed from the coating liquid containing the fine crystal raises a problem of having a large optical scattering and providing a low transparency.

[Patent Document 1]
Japanese Unexamined Patent Publication No. 2009-139806

An object of the present invention is to provide a method of producing a liquid crystalline coating liquid that substantially does not contain a fine crystal.

The present inventors have made eager studies on a cause by which a fine crystal is contained in the coating liquid.

The coating liquid is obtained, for example, by dispersing a lyotropic liquid crystalline compound into a solvent. However, it is practically difficult to use a lyotropic liquid crystalline compound having a purity of 100%. Therefore, a lyotropic liquid crystalline compound that is used contains a little impurity. The present inventors have found out that this impurity is a substance of causing the fine crystal, thereby completing the present invention.

The method of producing a liquid crystalline coating liquid of the present invention contains a heating step of heating a treatment liquid containing a lyotropic liquid crystalline compound containing an impurity, and a solvent, a depositing step of depositing a deposit by cooling the treatment liquid after the heating step to a temperature lower than 40° C., and a removing step of removing the deposit from the treatment liquid.

By the aforementioned method of producing a liquid crystalline coating liquid, most of the impurity contained in the lyotropic liquid crystalline compound is deposited as a deposit, and this is removed from the treatment liquid. For this reason, containment of fine crystals derived from the impurity in the obtained liquid crystalline coating liquid can be suppressed.

In a preferable method of producing a coating liquid of the present invention, the impurity is hardly soluble to the solvent, and the lyotropic liquid crystalline compound is soluble to the solvent.

In another preferable method of producing a coating liquid of the present invention, the deposit is deposited with a fine crystal of the impurity serving as a nucleus in the depositing step.

In another preferable method of producing a coating liquid of the present invention, the aforesaid solvent is an aqueous solvent, and the lyotropic liquid crystalline compound is an aromatic disazo-based compound represented by the following formula (1).

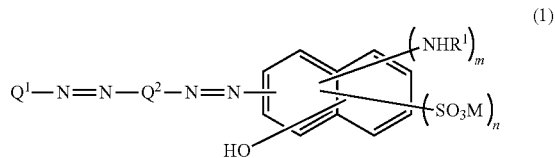

In the general formula (1), $Q^1$ represents a substituted or non-substituted aryl group, $Q^2$ represents a substituted or non-substituted arylene group, $R^1$ independently represents a hydrogen atom, a substituted or non-substituted alkyl group, a substituted or non-substituted acetyl group, a substituted or non-substituted benzoyl group, or a substituted or non-substituted phenyl group, M represents a counter ion, m represents an integer of 0 to 2, n represents an integer of 0 to 6, at least one of m and n is not 0, and $1 \leq m+n \leq 6$.

The groups OH, $(NHR^1)_m$ and $(SO_3M)_n$ shown in the general formula (1) may each be bonded to any one of the seven substitution sites of the naphthyl ring.

In another preferable method of producing a coating liquid of the present invention, the removing step includes a step of filtering the treatment liquid by using a filter having a pore diameter of 1 μm or less.

In another preferable method of producing a coating liquid of the present invention, the removing step includes a step of performing centrifugation on the treatment liquid.

In another aspect of the present invention, an optically anisotropic film is provided.

The optically anisotropic film of the present invention is obtained by applying a coating liquid obtained by the above production method on a development surface to form a coating film and solidifying the coating film.

According to the production method of the present invention, a liquid crystalline coating liquid that substantially does not contain a fine crystal can be obtained. Use of this liquid crystalline coating liquid enables to form an optically anisotropic film excellent in transparency.

BRIEF DESCRIPTION OF THE DRAWINGS

FIG. 1 is a microscope photograph view of optically anisotropic films of Examples 1 to 4 and Comparative Example 1.

SUMMARY OF THE INVENTION

The production method of producing a liquid crystalline coating liquid of this invention contains a heating step of heating a treatment liquid containing a lyotropic liquid crystalline compound containing an impurity, and a solvent, a depositing step of depositing a deposit by cooling the treatment liquid after the heating step to a temperature lower than 40° C., and a removing step of removing the deposit from the treatment liquid.

The lyotropic liquid crystalline compound that is used normally contains an impurity. This impurity becomes a substance of causing a fine crystal in the coating liquid. In order to suppress the growth of this fine crystal, a lyotropic liquid crystalline compound having a purity of 100% may be used, however, it is difficult to synthesize a lyotropic liquid crystalline compound having a purity of 100%. In the present invention, the impurity is deposited as a comparatively large deposit in the process of producing the coating liquid. The comparatively large deposit can be removed from the liquid by a simple method such as filtration and the like. By removing the deposit, a coating liquid that substantially does not contain a fine crystal can be obtained. Use of a coating liquid that substantially does not contain a fine crystal enables to form an optically anisotropic film excellent in transparency.

Hereafter, specific description will be given.
[Lyotropic Liquid Crystalline Compound]

The lyotropic liquid crystalline compound that is used in the present invention is not particularly limited as long as the compound can form a supramolecular associated body in the liquid and exhibit a liquid crystal phase. Such a lyotropic liquid crystalline compound may be, for example, an azo-based compound, an anthraquinone-based compound, a perylene-based compound, a quinophthalone-based compound, a naphthoquinone-based compound, a merocyanine-based compound and the like. The azo-based compound is used preferably since it exhibits a good lyotropic liquid crystallinity.

Here, the lyotropic liquid crystallinity means a property of generating a phase transition of isotropic phase-liquid crystal phase in the liquid by changing the temperature or concentration.

Among the azo-based compounds, an azo-based compound having an aromatic ring in its molecule is preferable, and a disazo-based compound having a naphthalene ring is more preferable. An optically anisotropic film excellent in polarization property can be obtained by forming of the coating liquid containing such an azo-based compound into a film.

Also, the azo-based compound is preferably an azo-based compound having a polar group in its molecule. An azo-based compound having a polar group is soluble in an aqueous solvent and is likely to form a supramolecular associated body by being dissolved in the aqueous solvent. For this reason, a coating liquid containing an azo-based compound having a polar group exhibits an especially good lyotropic liquid crystallinity.

Here, the polar group means a functional group having a polarity. The polar group may be, for example, a functional group containing oxygen and/or nitrogen having a comparatively large electronegativity such as OH group, COOH group, $NH_2$ group, $NO_2$ group, or CN group.

A specific example of the azo-based compound having a polar group may be the aromatic disazo compound represented by the following general formula (1).

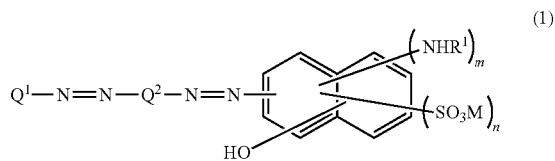

In the general formula (1), $Q^1$ represents a substituted or non-substituted aryl group, $Q^2$ represents a substituted or non-substituted arylene group, $R^1$ independently represents a hydrogen atom, a substituted or non-substituted alkyl group, a substituted or non-substituted acetyl group, a substituted or non-substituted benzoyl group, or a substituted or non-substituted phenyl group, M represents a counter ion, m represents an integer of 0 to 2, n represents an integer of 0 to 6. However, at least one of m and n is not 0, and 1≤m+n≤6. When m is 2, each $R^1$ may be the same or different.

The groups OH, $(NHR^1)_m$, and $(SO_3M)_n$ shown in the general formula (1) may each be bonded to any one of the seven substitution sites of the naphthyl ring.

In the present specification, "substituted or non-substituted" means "substituted with a substituent group or not substituted with a substituent group".

Also, in the present specification, the description of "X to Y" means "X or more and Y or less".

The bonding position of the naphthyl group and the azo group (—N═N—) in the general formula (1) is not particularly limited. The naphthyl group indicates the naphthyl group shown on the right side in the formula (1). Preferably, the naphthyl group and azo group are bonded at the 1-position or the 2-position of the naphthyl group.

When the alkyl group, acetyl group, benzoyl group, or phenyl group of $R^1$ of the general formula (1) has a substituent group, the substituent group may be, for example, any of the substituent groups exemplified in the following aryl group or arylene group.

$R^1$ is preferably a hydrogen atom, a substituted or non-substituted alkyl group, a substituted or non-substituted acetyl group, and more preferably a hydrogen atom.

The substituted or non-substituted alkyl group may be a substituted or non-substituted alkyl group with a carbon number of 1 to 6.

In the general formula (1), M (counter ion) is preferably a hydrogen ion; an alkali metal ion such as Li, Na, K, Cs and the like; an alkaline-earth metal ion such as Ca, Sr, Ba and the like; other metal ions; an ammonium ion that may be substituted by an alkyl group or a hydroxyalkyl group; a salt of an organic amine; and the like. The metal ion includes, for example, $Ni^+$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, $Ce^{3+}$, and the like. The organic amine may be an alkylamine with a carbon number of 1 to 6, an alkylamine with a carbon number of 1 to 6 having a hydroxyl group, an alkylamine with a carbon number of 1 to 6 having a carboxyl group. In the above general formula (1), when two or more SO₃M groups are present, each M may be the same or different. Also, when M of the SO₃M group is a divalent or more-valent cation in the above general formula (1), the M is stabilized by being electrostatically bonded to other anions in the liquid or is stabilized by being bonded to the $SO_3^-$ of another azo-based compound of the general formula (1) in the liquid.

In the general formula (1), m is preferably 1. Also, n in the general formula (1) is preferably 1 or 2.

Specific examples of the naphthyl group in the general formula (1) includes, for example, the following formulae (a) to (l) and the like. $R^1$ and M of the formulae (a) to (l) are the same as those in the general formula (1).

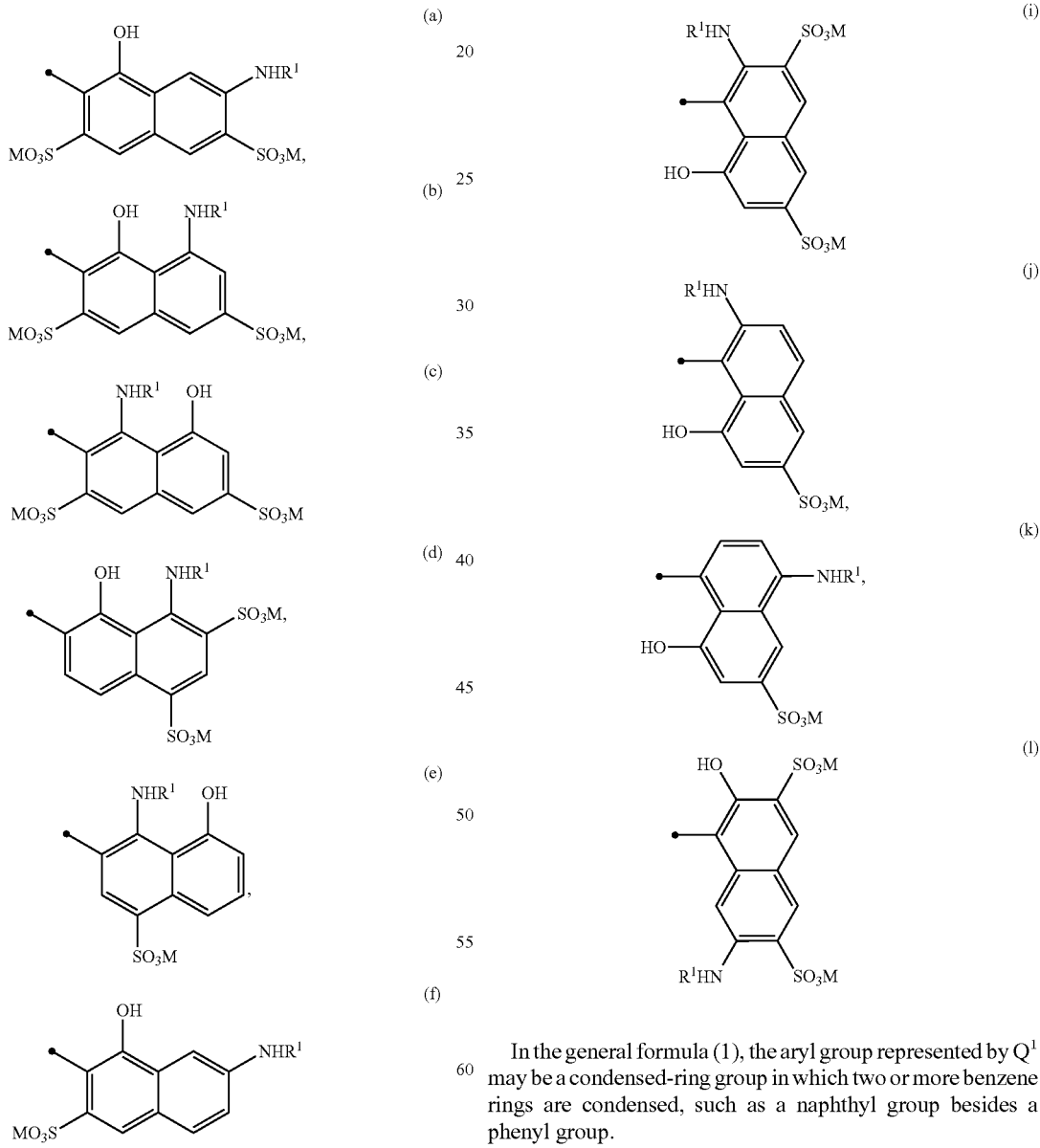

In the general formula (1), the aryl group represented by $Q^1$ may be a condensed-ring group in which two or more benzene rings are condensed, such as a naphthyl group besides a phenyl group.

The arylene group represented by $Q^2$ may be a condensed-ring group in which two or more benzene rings are condensed, such as a naphthylene group besides a phenylene group.

The aryl group of $Q^1$ or the arylene group of $Q^2$ may or may not each have a substituent group. Whether the aryl group or the arylene group is substituted or non-substituted, the aromatic disazo compound of the general formula (1) having a polar group has excellent solubility in an aqueous solvent.

When the aryl group or the arylene group has a substituent group, the substituent group includes, for example, an alkyl group with a carbon number of 1 to 6, an alkoxy group with a carbon number of 1 to 6, an alkylamino group with a carbon number of 1 to 6, a phenylamino group, an acylamino group with a carbon number of 1 to 6, a hydroxyalkyl group with a carbon number of 1 to 6 such as a dihydroxypropyl group, a carboxyl group such as a COOM group and the like, a sulfonic acid group such as a $SO_3M$ group, a hydroxyl group, a cyano group, a nitro group, an amino group, a halogeno group, and the like. Preferably, the substituent group is the one selected from an alkoxy group with a carbon number of 1 to 6, a hydroxyalkyl group with a carbon number of 1 to 6, a carboxyl group, a sulfonic acid group, and a nitro group. The aromatic disazo compound having such a substituent group is particularly excellent in water solubility. These substituent groups may be substituted with one kind or with two or more kinds. Also, the substituent groups may be substituted at an arbitrary ratio.

$Q^1$ in the general formula (1) is preferably a substituted or non-substituted phenyl group, and more preferably a phenyl group having the substituent group.

The $Q^2$ is preferably a substituted or non-substituted naphthylene group, and more preferably a naphthylene group having the substituent group, and particularly preferably a 1,4-naphthylene group having the substituent group.

An aromatic disazo-based compound in which $Q^1$ in the general formula (1) is a substituted or non-substituted phenyl group and $Q^2$ is a substituted or non-substituted 1,4-naphthylene group is represented by the following general formula (2).

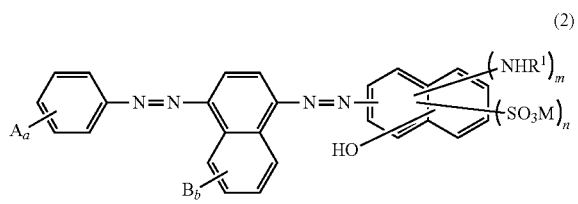

(2)

$R^1$, M, m, and n in the general formula (2) are the same as those in the general formula (1).

In the general formula (2), A and B represent a substituent group, and a and b represent a substitution number thereof. The A and B independently represent an alkyl group with a carbon number of 1 to 6, an alkoxy group with a carbon number of 1 to 6, an alkylamino group with a carbon number of 1 to 6, a phenylamino group, an acylamino group with a carbon number of 1 to 6, a hydroxyalkyl group with a carbon number of 1 to 6 such as a dihydroxypropyl group, a carboxyl group such as a COOM group, a sulfonic acid group such as a $SO_3M$ group, a hydroxyl group, a cyano group, a nitro group, an amino group, a halogeno group. Further, a represents an integer of 0 to 5, and b represents an integer of 0 to 4. However, at least one of a and b is not 0. When a is 2 or more, the substituent groups A may be the same or different. When b is 2 or more, the substituent groups B may be the same or different.

Among the aromatic disazo compounds included in the general formula (2), it is preferable to use the aromatic disazo compound shown in the following general formula (3). In the aromatic disazo compound of the general formula (3), the substituent group A is bonded to the para-position with the azo group (—N=N—) serving as a standard. Further, in the aromatic disazo compound of the general formula (3), the OH group of the naphthyl group thereof is bonded to a position adjacent to the azo group. When such an aromatic disazo compound of the general formula (3) is used, an optically anisotropic film having a high polarization degree can be obtained.

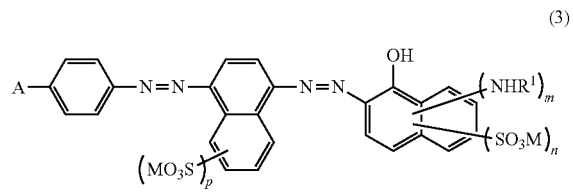

(3)

$R^1$, M, m, and n in the general formula (3) are the same as those in the general formula (1), and A is the same as the one in the general formula (2).

In the general formula (3), p represents an integer of 0 to 4. Further, p is preferably 1 or 2, and more preferably 1.

The aromatic disazo compound shown in the above general formulae (1) to (3) can be synthesized according to, for example, "Riron Seizo Senryo Kagaku (Theoretical Production, Dye Chemistry) $5^{th}$ edition" by Yutaka Hosoda, published on Jul. 15, 1968, GIHODO SHUPPAN Co., Ltd., pages 135 to 152.

For example, the aromatic disazo compound of the above general formula (3) can be synthesized by obtaining a monoazo compound through diazotization and coupling reaction between an aniline derivative and a naphthalene sulfonic acid derivative, after that, this monoazo compound and further goes through diazotization and further a coupling reaction with 1-amino-8-naphthol sulfonic acid derivative.

[Solvent]

The solvent that is used in the present invention is not particularly limited as long as it can disperse, precipitate, or dissolve the aforementioned lyotropic liquid crystalline compound.

When the lyotropic liquid crystalline compound is an azo-based compound having the polar group, it is preferable to use an aqueous solvent. Examples of the aqueous solvent include water; a hydrophilic solvent; and a mixed solvent containing water and the hydrophilic solvent. The hydrophilic solvent is a solvent that can be dissolved in water approximately uniformly. Examples of the hydrophilic solvent include, for example, alcohols such as methanol, ethanol, methyl alcohol, isopropyl alcohol, and the like; glycols such as ethylene glycol, diethylene glycol, and the like; cellosolves such as methyl cellosolve, ethyl cellosolve, and the like; ketones such as acetone, methyl ethyl ketone, and the like; esters such as ethyl acetate and the like. The aqueous solvent is preferably water or the mixed solvent containing water and the hydrophilic solvent.

The aromatic disazo compound of the general formulae (1) to (3) has a $NHR^1$ group and/or a $SO_3M$ group, therefore, it has excellent solubility in the aqueous solvent.

[Method of Producing Liquid Crystalline Coating Liquid]

[Pre-Treatment Step]

The pre-treatment step is a step of obtaining a treatment liquid containing a lyotropic liquid crystalline compound containing an impurity, and a solvent.

The lyotropic liquid crystalline compound and the solvent are suitably selected from among the above-described ones. Preferably, one kind or two or more kinds selected from the aromatic disazo compounds represented by the general formulae (1) to (3) are used as the lyotropic liquid crystalline compound, and the aqueous solvent is used as the solvent.

Hereafter, a case will be described in which the aromatic disazo compound is used as the lyotropic liquid crystalline compound and the aqueous solvent is used as the solvent; however, the lyotropic liquid crystalline compound and the solvent that are used are not limited to these.

The selected particular aromatic disazo compound can be synthesized as described above. The synthesized particular aromatic disazo compound does not have a purity of 100% and contains a little impurity. As this impurity, a structural isomer that is produced as a by-product at the time of synthesis, an unreacted substance of the synthesis raw material, and the like can be considered. The content of the impurity is not definite; however, the content seems to be about 0.1 to 5 parts by mass relative to 100 parts by mass of the aromatic disazo compound.

In the pre-treatment step, a treatment liquid is obtained by putting the lyotropic liquid crystalline compound containing the impurity into an aqueous solvent. Also, the aqueous solvent may be poured into the aromatic disazo compound containing the impurity.

The temperature of the aqueous solvent is about room temperature and, for example, 10 to 35° C. can be exemplified.

It is sufficient that the aromatic disazo compound is dispersed, precipitated, or dissolved in the aqueous solvent, or is in a state in which these are mixed.

Specifically, since the aromatic disazo compounds of the general formulae (1) to (3) are soluble in the aqueous solvent, the treatment liquid is in a state in which the aromatic disazo compound is dissolved in the aqueous solvent. Here, in the treatment liquid, part of the aromatic disazo compound may become a crystal body, and the crystal body may be dispersed or precipitated in the solvent. This is because, even when the crystal body of the aromatic disazo compound in a dispersed or precipitated state is present, the part of the aromatic disazo compound will be dissolved into the aqueous solvent by performing the subsequent heating step.

Also, it is preferable that the impurity is hardly soluble in the aqueous solvent. The impurity that is hardly soluble in the aqueous solvent is easily deposited as a deposit in the depositing step.

The concentration of the aromatic disazo compound in the treatment liquid is not particularly limited, however, it is normally 5 to 50% by mass and preferably 10 to 40% by mass.

The obtained treatment liquid may show a liquid crystal phase. The liquid crystal phase is not particularly limited, and includes a nematic liquid crystal phase, a middle phase, a smectic liquid crystal phase, a cholesteric liquid crystal phase, a hexagonal liquid crystal phase, or the like. The liquid crystal phase can be confirmed and identified from an optical pattern when observed by using a polarization microscope.

Also, an additive may be added into the treatment liquid. Examples of the additive include a compatibilizer, a surfactant, a thermal stabilizer, an optical stabilizer, a lubricant, an antioxidant, an ultraviolet absorber, a flame retardant, an antistatic agent, a thickening agent, and the like. The concentration of the additive in the treatment liquid is preferably more than 0% and 10% by mass or less.

(Heating Step)

The heating step is a step of heating the treatment liquid.

The heating temperature is above or equal to the temperature at which the treatment liquid undergoes phase transition to an isotropic phase. Specifically, the temperature is over 40° C., preferably 45 to 100° C., more preferably 60 to 100° C., and particularly preferably 80 to 100° C.

By performing the heating step, the treatment liquid in which the entire lyotropic liquid crystalline compounds are substantially dissolved in the aqueous solvent is obtained. Also, the treatment liquid that has been subjected to the heating treatment exhibits an isotropic phase in which the molecules of the lyotropic liquid crystalline compound are randomly present without an order.

The period of time for heating the treatment liquid is not particularly limited, so that, for example, a state in which the temperature of the treatment liquid is raised to the heating temperature may be maintained for 1 minute or more, preferably 1 to 60 minutes.

The heating method for heating the treatment liquid is not particularly limited as well, for example, a hot plate, a thermostatic oven, an electric heating furnace, and the like can be used.

(Depositing Step)

The depositing step is a step of depositing a deposit by cooling the treatment liquid after the heating step to a temperature lower than 40° C.

The temperature for cooling the treatment liquid is less than 40° C., preferably 38° C. or less, more preferably 36° C. or less, and particularly preferably 35° C. or less.

By cooling the treatment liquid with such temperature, the impurity is deposited as a comparatively large deposit.

The lower limit of the temperature for cooling the treatment liquid is not particularly limited; however, the lower limit is −20° C. or more, and preferably −10° C. or more.

Since the treatment liquid contains a lyotropic liquid crystalline compound, the treatment liquid is not solidified (frozen) even at 0° C. or less because of the freezing point depression. However, there is a fear that the treatment liquid may be solidified less than −20° C.

The speed for cooling the treatment liquid is not particularly limited; however, the speed is preferably 1 to 20° C./minute. By such a cooling speed, the impurity can be precipitated as a deposit.

As mentioned above, by keeping the treatment liquid less than 40° C. after the heating step, the impurity is deposited as a deposit. The function thereof is not definite; however, it is assumed as follows.

An impurity that is hardly soluble in the aqueous solvent is not dissolved in the solvent in the treatment liquid obtained in the pre-treatment step. By heating this treatment liquid in the heating step, the impurity becomes soluble in the aqueous solvent. Thereafter, by cooling the treatment liquid, the impurity is produced as fine crystals that are insoluble in the aqueous solvent. Then, in the cooling step, the impurity will grow with the fine crystals of the impurity serving as a nucleus, whereby a comparatively large deposit is deposited. Here, it seems that the comparatively large deposit is produced by further agglomeration of the impurity or the aromatic disazo compound to the fine crystals of the impurity and growth of the fine crystals to large ones.

The size of the deposit is more than 1 μm and 3 μm or less in its maximum diameter, preferably 1.5 to 3 μm in its maximum diameter. The maximum diameter means the length of the longest part of the shape when the deposit is viewed in a plane. For example, when the deposit has an approximately spherical shape, the maximum diameter of the deposit corresponds to the diameter. When the deposit has an approximately ellipsoid shape, the maximum diameter of the deposit corresponds to the longer diameter.

The maximum diameter of the deposit can be measured by enlarging the deposit with a microscope.

(Removing Step)

The removing step is a step of removing the deposit from the treatment liquid.

By performing the aforementioned depositing step, the comparatively large deposit can be deposited in the treatment liquid. Such a deposit can be removed from the treatment liquid by a simple method.

The method of removing the deposit may be, for example, filtration using a filter, solid-liquid separation using a centrifuge, or the like, and these methods may be used either alone or as a combination of two methods.

The filter is not particularly limited as long as it can let the treatment liquid pass therethrough and can capture only the deposit. Since the maximum diameter of the deposit exceeds 1 μm, it is preferable to use a filter having a pore diameter of 1 μm or less. Further, it is more preferable to use a filter having a pore diameter of 0.5 μm or less. The lower limit of the pore diameter of the filter is not particularly limited; however, it is preferable to use a filter having a pore diameter of 0.05 μm or more in consideration of the filtration time and the like.

The material of the filter is not particularly limited and may be, for example, a synthetic resin, a metal, cellulose type, an inorganic compound, or the like.

By allowing the treatment liquid to pass through the filter, the deposit can be removed by filtration.

As the centrifuge, a conventionally known one may be used. The centrifugation condition is not particularly limited; however, the condition may be, for example, 5 to 15 krpm for 1 to 30 minutes, preferably 5 to 15 krpm for 5 to 15 minutes.

By performing centrifugation, the deposit is sedimented. Therefore, by taking the supernatant liquid after the centrifugation, the deposit can be removed from the treatment liquid.

[Coating Liquid]

The liquid crystalline coating liquid that is obtained using the above described method does not substantially contain fine crystals. By using the liquid crystalline coating liquid that does not substantially contain fine crystals, a film that has a small optical scattering and is excellent in transparency can be formed.

The concentration of the aromatic disazo compound in the coating liquid is not particularly limited; however, it is normally 1 to 50% by mass, and preferably 1 to 40% by mass.

The coating liquid of the aforesaid concentration range, for example, shows a good liquid crystal phase when the temperature is 23° C.

Further, polyvinyl alcohol may be added to the coating liquid. By forming the coating liquid containing polyvinyl alcohol into a film, an optically anisotropic film having a higher degree of polarization can be obtained.

The saponification degree of the polyvinyl alcohol is 97% or more, and preferably 98% or more.

[Production of Optically Anisotropic Film]

The liquid crystalline coating liquid can be subjected to film formation (can be formed into a film) by for example, the solution casting method. The film obtained by film formation of the coating liquid can be used as an optically anisotropic film.

Hereafter, a method of producing an optically anisotropic film using the liquid crystalline coating liquid will be briefly described.

First, the coating liquid is applied onto a suitable developing surface so as to form a coating film.

The developing surface is a surface for developing the coating liquid approximately uniformly. The kind of the developing surface is not particularly limited as long as it suits this purpose. The development surface may be, for example, a surface of a polymer film, a surface of a glass plate, a surface of a metal drum, or the like. Also, an oriented film may be used as the polymer film. Since the oriented film has an orientation regulating force on the surface thereof, the lyotropic liquid crystalline compound can be oriented with certainty.

The application of the coating liquid can be performed by using a coater that is conventionally known in the art.

When the coating liquid in a liquid crystal state is applied onto a development surface, a shearing force is applied to the supramolecular associated body of the lyotropic liquid crystalline compound during the process. Therefore, a coating film in which the supramolecular associated body is oriented in a predetermined direction can be formed on the development surface.

Next, the coating film is solidified. When an aqueous solvent is used as the solvent, the coating film is dried. During the process of drying the coating film, the oriented lyotropic liquid crystalline compound is fixed. The coating film having been dried is an optically anisotropic film.

A thickness of the optically anisotropic film that is obtained is preferably 0.05 μm to 10 μm.

When a lyotropic liquid crystalline compound having an absorption function in the visible light region is used, the optically anisotropic film can be used as a polarizing film. When a lyotropic liquid crystalline compound having no absorption function or little absorption function in the visible light region is used, the optically anisotropic film can be used as a retardation film.

[Usage of the Optically Anisotropic Film and the Like]

The optically anisotropic film of the present invention can be used, for example, as a constituent member of an image display such as a liquid crystal display, an organic EL display, and the like.

When the image display is a liquid crystal display, the preferable usage is a television set, a portable apparatus, a video camera, and the like.

EXAMPLES

Hereafter, the present invention will be further described by showing Examples and Comparative Examples. However, the present invention is not particularly limited to the following Examples. Here, the measuring methods used in Examples and Comparative Examples are as follows.

[Observation of Liquid Crystal Phase and Observation of Deposit in Treatment Liquid]

A small amount of the treatment liquid of the Example or the like was sandwiched between two sheets of slide glass, and the liquid crystal phase was observed by using a polarization microscope at room temperature (23° C.). Also, with using the same manner, the deposit was observed and then the maximum diameter thereof was measured.

As the polarization microscope, the polarization microscope (manufactured by Olympus Co., Ltd., product name: "OPTIPHOT-POL") that is equipped with the Large-sized Sample Heating and Cooling Stage (manufactured by JAPAN HIGH TECH Co., Ltd., product name: "10013L") was used.

[Composition Analysis]

Analysis of the solid components contained in the treatment liquid was carried out by using high performance liquid chromatography (manufactured by Agirent Technology Co., Ltd., product name: "HP1100"). As the column thereof, Inertsil ODS3 (4.6 mmφ×25 cm, 5 μm) (manufactured by GL Science Co., Ltd.) was used. As the mobile phase, 0.025% aqueous solution of Na$_2$PO$_4$/0.1% TBAB/AN solution was used. Detection was carried out at a wavelength of 254 nm.

[Observation of Optically Anisotropic Film]

An optically anisotropic film obtained in the Example or the like and a commercially available polarizing film were superposed so that the polarization axes thereof would be in crossed nicol with each other, and the optically anisotropic film was observed with use of the polarization microscope (manufactured by Olympus Co., Ltd., product name: "OPTIPHOT-POL").

[Synthesis Example of Aromatic Disazo Compound]

A monoazo compound was obtained by diazotization and the coupling reaction between 4-nitroaniline and 8-amino-2-naphthalene sulfonic acid by following the method described in the above reference. Then, this monoazo compound was diazotized by following the same method, and further a crude product was obtained by coupling reaction between 1-amino-8-naphthol-2,4-disulfonic acid lithium salt. The aromatic disazo compound represented by the following structural formula (4) was obtained by salting out this composition with a lithium chloride.

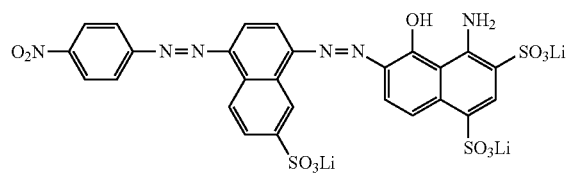

(4)

[Preparation of Treatment Liquid A and Composition Analysis]

The aromatic disazo compound of the above formula (4) was dissolved in ion exchanged water, and the treatment liquid A of the concentration of 20% by mass was prepared. This treatment liquid A was collected using a dropping pipette made of polyethylene, then small amount of the treatment liquid was sandwiched between two sheets of slide glass and observed by using the polarization microscope. As a result, the treatment liquid A exhibited a nematic liquid crystal phase.

Also, in order to examine the composition of the solid components contained in this treatment liquid A, the treatment liquid A was subjected to high performance liquid chromatography (HPLC) for analysis. As a result thereof, the aromatic disazo compound occupied 96% in area ratio, and the hardly soluble components occupied 0.5% in area ratio. By analysis using HPLC, it could be confirmed that these hardly soluble components are an impurity that is not an aromatic disazo compound.

Example 1

The aromatic disazo compound of the above formula (4) was dissolved in ion exchanged water, and the treatment liquid B of the concentration of 15% by mass was prepared.

This treatment liquid B was heated while being stirred until the liquid temperature became 90° C., and this state was maintained for 30 minutes. Thereafter, the treatment liquid B was put into a thermostated chamber of 23° C. and was left to stand therein for 48 hours for natural cooling.

The treatment liquid B having been subjected to cooling was observed with use of the polarization microscope. As a result thereof, a deposit having a diameter of about 2 μm was confirmed in the liquid.

This treatment liquid B containing the deposit was filtered with use of a syringe filter having a pore diameter of 0.20 μm (manufactured by ADVANTEC Co., Ltd., product name: "DISMIC 25HP020AN") so as to remove the deposit. This filtrate (the treatment liquid B from which the deposit had been removed) was observed with use of the polarization microscope. As a result thereof, a deposit was not present in the filtrate, and also the filtrate exhibited a nematic liquid crystal phase.

Further, this filtrate was analyzed with use of high performance liquid chromatography (HPLC) in the same manner as the above-described composition analysis of the treatment liquid A. As a result thereof, the aromatic disazo compound occupied 97% in area ratio, and the hardly soluble components occupied 0.04% in area ratio.

The above mentioned filtrate was used as a coating liquid of Example 1. The coating liquid was applied on the surface of the norbornene-based polymer film (manufactured by Zeon Co., Ltd., product name: "ZEONOR") that is subjected to a rubbing treatment and a corona treatment by using a bar coater (manufactured by BUSCHMAN Co., Ltd., product name: "Mayer rot HS5"). An optically anisotropic film was fabricated by naturally drying the coating film in a thermostatic chamber of 23° C.

The obtained optically anisotropic film was observed by a polarization microscope, with a result that a foreign substance was not seen. The microscope photograph of the film is shown in FIG. 1.

Example 2

The treatment liquid B was prepared in the same manner as in Example 1, and it was heated and cooled.

In the treatment liquid B after being cooled, a deposit having a diameter of about 2 μm was confirmed in the same manner as in Example 1.

After this treatment liquid B containing the deposit was subjected to centrifugation using a centrifuge (manufactured by Tomy Seikou Co., Ltd., product name: "High Speed Refrigerated Micro Centrifuge MX-305 type"), the supernatant liquid was taken out to remove the deposit. However, the centrifugation was carried out by dividing the liquid into four centrifugation tubes each taking 100 ml of the liquid and operating the centrifuge at 10 krpm for 10 minutes.

This supernatant liquid (the treatment liquid from which the deposit had been removed) was observed with use of the polarization microscope. As a result thereof, a deposit was not present in the supernatant liquid, and also the supernatant liquid exhibited a nematic liquid crystal phase.

Further, this supernatant liquid was analyzed using high performance liquid chromatography (HPLC) in the same manner as the above described composition analysis of the treatment liquid A. As a result thereof, the aromatic disazo compound was 97%, and the hardly soluble component was 0.1%.

The above mentioned supernatant liquid was used as a coating liquid in Example 2. An optically anisotropic film was fabricated by forming a film using this coating liquid in the same manner as Example 1. When the obtained optically anisotropic film was observed with a polarization microscope, a foreign substance was not seen. The microscope photograph of the film is shown in FIG. 1.

Example 3

The treatment liquid B was heated and cooled in the same manner as in Example 1 except that the treatment liquid B was left to stand in the thermostated chamber of 35° C. for 48 hours for natural cooling instead of leaving the treatment liquid B to stand at 23° C. for 48 hours for cooling.

In the treatment liquid B after being cooled, a deposit having a diameter of about 2 μm was confirmed in the same way as in Example 1.

After this treatment liquid B containing the deposit was filtered in the same manner as Example 1 with use of a syringe filter having a pore diameter of 0.20 μm, an optically anisotropic film was fabricated.

When the obtained optically anisotropic film was observed with the polarization microscope, a foreign substance was not seen.

Comparative Example 1

The treatment liquid B was prepared in the same manner as Example 1, and it was heated and cooled.

In the treatment liquid B after being cooled, a deposit having a diameter of about 2 μm was confirmed in the same way as in Example 1.

This treatment liquid B was used as a coating liquid in Comparative Example 1. An optically anisotropic film was fabricated by forming a film using this coating liquid in the same manner as Example 1. The obtained optically anisotropic film was observed by the polarization microscope, with a result that many foreign substances were seen. The microscope photograph of the film is shown in FIG. 1.

INDUSTRIAL APPLICABILITY

The method of producing a liquid crystalline coating liquid of the present invention can be used in the production of a coating liquid that substantially does not contain a fine crystal. This coating liquid can be used as a material for forming an optically anisotropic film.

What is claimed is:

1. A method of producing a liquid crystalline coating liquid comprising:
    a heating step of heating a treatment liquid containing a lyotropic liquid crystalline compound in a solvent, the lyotropic liquid crystalline compound containing an impurity to be removed;
    a depositing step of depositing the impurity as a deposit from the lyotropic liquid crystalline compound by cooling the treatment liquid after the heating step to a temperature lower than 40° C.; and
    a removing step of removing the impurity as the deposit from the treatment liquid.

2. The method of producing a liquid crystalline coating liquid according to claim 1,
    wherein the impurity is hardly soluble in the solvent at room temperature, and
    wherein the lyotropic liquid crystalline compound is soluble in the solvent at room temperature.

3. The method of producing a liquid crystalline coating liquid according to claim 1,
    wherein in the depositing step, the impurity is first deposited from the lyotropic liquid crystalline compound as a fine crystal which serves as a nucleus for further deposition of the impurity, and
    wherein the deposit is formed upon further deposition of the impurity on the nucleus.

4. The method of producing a liquid crystalline coating liquid according to claim 1,
    wherein the solvent is an aqueous solvent, and the lyotropic liquid crystalline compound is an aromatic disazo-based compound represented by the following formula (1):

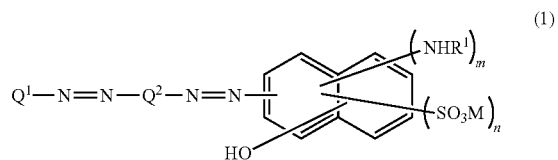

wherein $Q^1$ represents a substituted or non-substituted aryl group; $Q^2$ represents a substituted or non-substituted arylene group; $R^1$ independently represents a hydrogen atom, a substituted or non-substituted alkyl group, a substituted or non-substituted acetyl group, a substituted or non-substituted benzoyl group, or a substituted or non-substituted phenyl group; M represents a counter ion; m represents an integer of 0 to 2; n represents an integer of 0 to 6; at least one of m and n is not 0; and $1 \leq m+n \leq 6$.

5. The method of producing a liquid crystalline coating liquid according to claim 1, wherein the removing step includes a step of filtering the treatment liquid by using a filter having a pore diameter of 1 μm or less.

6. The method of producing a liquid crystalline coating liquid according to claim 1, wherein the removing step includes a step of performing centrifugation on the treatment liquid.

7. An optically anisotropic film obtained by applying a liquid crystalline coating liquid obtained by the production method according to claim 1 on a developing surface to form a coating film and solidifying the coating film.

8. A method of producing an optically anisotropic film, comprising:
    producing a liquid crystalline coating liquid according to the method of claim 1,
    applying the liquid crystalline coating liquid on a developing surface to form a coating film, and
    solidifying the coating film.

* * * * *

UNITED STATES PATENT AND TRADEMARK OFFICE
CERTIFICATE OF CORRECTION

| | | |
|---|---|---|
| PATENT NO. | : 8,808,813 B2 | Page 1 of 4 |
| APPLICATION NO. | : 13/579408 | |
| DATED | : August 19, 2014 | |
| INVENTOR(S) | : Shoichi Matsuda et al. | |

It is certified that error appears in the above-identified patent and that said Letters Patent is hereby corrected as shown below:

TITLE PAGE: ITEM (57)

Line 9

Change

"40 ° C."

To Be

--40 ° C--

IN THE SPECIFICATION:

Column 2, Line 12

Change

"40 ° C."

To Be

--40 ° C--

Column 3, Line 22

Change

"40 ° C."

To Be

--40 ° C--

Signed and Sealed this

Thirteenth Day of January, 2015

Michelle K. Lee
*Deputy Director of the United States Patent and Trademark Office*

Column 9, Line 29

Change

"35 °C."

To Be

--35 °C--

Column 10, Lines 3-4

Change

"40 °C.", "45 to 100 °C.", and "60 to 100 °C."

To Be

--40 °C--, --45 to 100 °C--, and --60 to 100 °C--, respectively.

Column 10, Lines 28-29

Change

"40 °C.", "38 °C.", "36 °C.", and "35 °C."

To Be

--40 °C--, --38 °C--, --36 °C--, and --35 °C--, respectively.

Column 10, Line 34

Change

"limit is -20 °C. or more" and "preferably -10 °C. or more"

To Be

--limit is -20 °C or more-- and --preferably -10 °C or more--

Column 10, Line 37

Change

"0 °C."

To Be

--0 °C--

Column 10, Lines 41-42

Change

"20 °C./minute"

To Be

--20 °C/minute--

Column 10, Line 45

Change

"40 °C."

To Be

--40 °C--

Column 12, Line 55

Change

"(23 °C.)"

To Be

--(23 °C)--

Column 13, Line 64

Change

"90 °C."

To Be

--90 °C--

Column 13, Line 66

Change

"23 °C."

To Be

--23 °C--

Column 15, Line 8

Change

"35 °C."

To Be

--35 °C--

Column 15, Line 10

Change

"23 °C."

To Be

--23 °C--

IN THE CLAIMS:

Claim 1 at Column 15, Line 54

Change

"40 °C."

To Be

--40 °C--